April 8, 1941.   W. D. COCKRELL   2,237,811

STRIP WIDTH INDICATING DEVICE

Filed July 13, 1940

Inventor:
William D. Cockrell,
by Harry E. Dunham
His Attorney.

Patented Apr. 8, 1941

2,237,811

UNITED STATES PATENT OFFICE 2,237,811

STRIP WIDTH INDICATING DEVICE

William D. Cockrell, Schenectady, N. Y., assignor to General Electric Company, a corporation of New York Application July 13, 1940, Serial No. 345,426

8 Claims. (Cl. 33—125)

This invention relates to indicating devices, more particularly to devices for indicating variations in position of the edge and also the width of a strip of moving material such as steel, and it has for an object the provision of a simple, reliable, and improved device of this character.

A further object of the invention is the provision of a device of this character that has a high degree of accuracy.

In carrying the invention into effect in one form thereof, a support is positioned in proximity to one edge of the strip. An electric meter element having a stationary member and a cooperating movable member is mounted on the support, a light sensitive device is also mounted on the support and is connected in an electric circuit. A mirror is mounted on the movable member of the meter and a source of light projects a narrow beam of light to the mirror so as to be reflected past the edge of the moving strip to the light sensitive device so that the amount of light received by the light sensitive device and the current flowing in the circuit in which it is connected are varied in response to movements of the edge of the strip from a predetermined position. The current flowing in the circuit of the light sensitive device is amplified by means of an amplifier, and the amplified current is supplied from the output circuit of the amplifier to the meter thereby to cause the movable meter member to move the light beam to a position in which the amount of light received by the light sensitive device and the current supplied to the meter have a predetermined relationship to the position of the edge of the strip. An indicating device is included in the connections between the amplifier and the meter element and is calibrated to indicate variations in the position of the edge of the strip.

Figure 1:
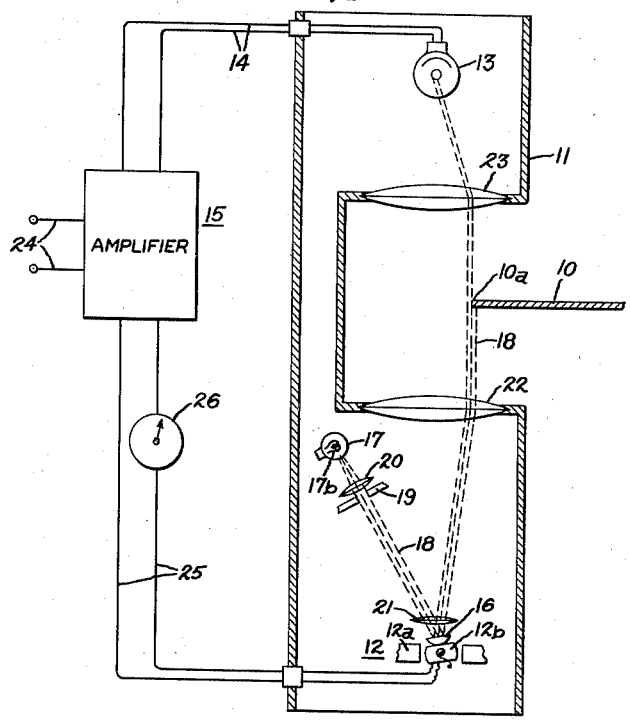
Figure 2:
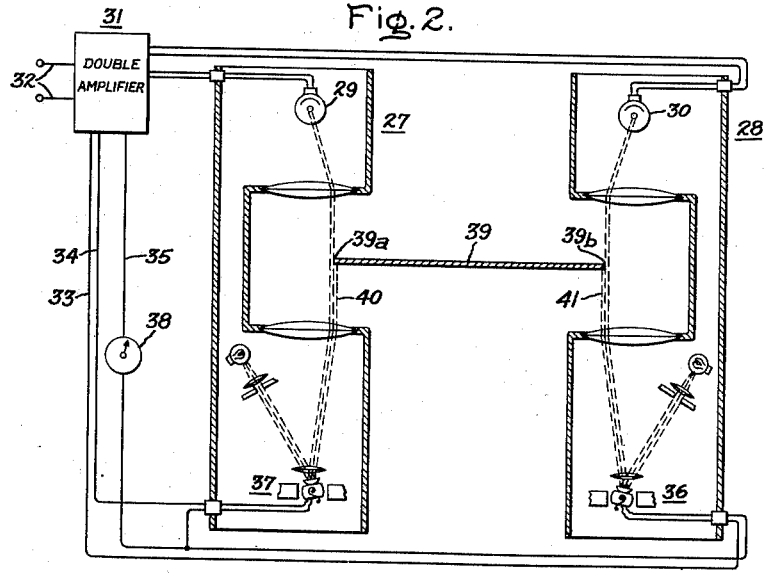

For a better and more complete understanding of the invention, reference should now be had to the following specification and to the accompanying drawing in which Fig. 1 is a simple, diagrammatical sketch of an embodiment of the invention and Fig. 2 is a simple diagrammatical sketch of a modification.

Referring now to the drawing, a strip of material 10 such, for example, as a strip of hot steel, is being passed from one stand (not shown) of a rolling mill to a second stand thereof. This strip is moving in a direction which, in the drawing, is perpendicular to the plane of the drawing, and is therefore shown in section. The right-hand edge of the strip is illustrated broken to indicate that less than the full width of the strip is shown.

A supporting housing 11 is mounted in proximity to the edge 10a of strip 10. As shown, the inside wall of the housing is recessed to allow the edge 10a of the strip to project past the inside wall.

An electric meter element 12 comprising a stationary member 12a and a cooperating movable member 12b is mounted on the housing 11 at a suitable point beneath the edge 10a of the strip. A light sensitive device 13 such as a photoelectric cell is mounted on the housing 11 in a suitable location above the edge 10a of the strip.

The photoelectric cell 13 is connected in a suitable circuit represented by conductors 14 which lead to a suitable electronic amplifier 15. Amplifiers are well understood devices and suitable types are procurable on the market. Since the specific construction and details of the amplifier are not material to the invention, the amplifier 15 is illustrated conventionally in the drawing.

The movable member 12b of the meter element is provided with a mirror 16. A source of light, illustrated as a lamp 17 with a concentrated filament 17b, projects a relatively narrow beam of light 18 through a slit in a member 19 to the mirror 16. A light beam having a width of between $\frac{1}{8}''$ and $\frac{1}{4}''$ has been found to produce satisfactory results.

The light beam 18 is reflected from mirror 16 through lens 21 and a large projecting lens 22 past the edge 10a of the strip and through a second large collecting lens 23 to the photoelectric cell 13.

Electric power is supplied to amplifier 15 from a suitable source represented by the two supply lines 24, and the output terminals of the amplifier are connected through conductors 25 to a winding on the movable member 12b of the meter element, so that the direct current output of the amplifier passes through this winding.

An indicating device illustrated conventionally as a direct current meter 26 is connected in the output circuit of the amplifier.

Initially, the apparatus is so adjusted that when the edge 10a of the strip is in a predetermined position it projects into the light beam and intercepts a portion of the beam and allows the remaining portion to be transmitted to the photoelectric cell 13.

The electronic circuit is such that when the photoelectric cell 13 is dark, the current flowing in the output circuit of the amplifier is maximum, and any increase in the amount of light falling on the photoelectric cell decreases the output current.

If the edge 10a of the strip moves toward the left, it will intercept a greater portion of the light beam 18 and thus decrease the amount of light received by the photoelectric cell. As a result, the output current of the amplifier 15 will be increased and this increased current will cause the movable member 12b which carries the mirror to rotate in a counterclockwise direction. This shifts the light beam 18 toward the left so that a greater portion of the beam passes the edge 10a and falls upon the photoelectric cell and decreases the current supplied from the amplifier to the meter element until the amount of light received by the photoelectric cell and the current supplied to the meter have a predetermined relationship to the position of the edge of the strip, which results in a balanced condition.

If the edge 10a of the strip had moved to the right, the light beam would have been deflected toward the right until a balanced condition prevailed. Thus, whichever way the edge of the strip moves, the mirror 16 will be deflected to move the light beam in the same direction. For any position of the edge of the strip, the mirror will be deflected just sufficiently to permit enough light to reach the photoelectric cell to assure a balanced condition. Since the light beam instrument 12 produces a definite deflection for each value of current passing through its coil, the current will be a true indication of the position of the edge of the strip within an accuracy equal to, or better than, the width of the light beam projected, and the current indicating instrument 26 may be calibrated in terms of position of the edge of the strip with respect to a predetermined position.

The optical system, lenses 21 and 22, is preferably designed so that the image of the slit in member 19 is sharply focused at the point at which the strip normally enters the beam and thus the maximum accuracy is assured. The collimator lens 20 concentrates the maximum light on the mirror 16 to increase the intensity of the beam.

In the modification of Fig. 2, two units 27 and 28 are employed. Units 27 and 28 are constructed left- and right-hand, as shown in the drawing. Otherwise, they are identical with the unit of Fig. 1. The circuits of the two photoelectric cells 29 and 30 are connected to a double amplifier 31 which is supplied from a suitable source 32. This double amplifier has two output circuits comprising conductors 33 and 34 and the common return conductor 35. The output circuit 33 supplies the amplified current of photoelectric cell 30 to meter element 36, and output circuit 34 supplies the amplified current of photoelectric cell 29 to meter element 37. A direct current indicating instrument 38 is included in the common return connection 35.

The units 27 and 28 operate in response to changes in the positions of the edges 39a and 39b of the strip 39 in the same manner as that of the unit of Fig. 1, as described in the foregoing. If the strip 39 should move laterally within the limits of movement of beams 40 and 41, the current subtracted from one photoelectric cell circuit will be exactly that which is added to the other so that the meter 38 will not change its reading.

However, if the actual width of the strip should become greater or less, the sum of the currents in the two photoelectric cell circuits will change and the indicating meter 38 will receive a different sum of currents from the double amplifier and a change in reading will result. Since the strip passes between the two parallel beams of light, any motion parallel to their direction, i. e. any up and down whipping motion of the strip will, of course, have little effect on the reading.

In order to prevent the photoelectric cells from responding to the infra red light from the hot steel, the photoelectric cells are preferably of the type which is blue sensitive, i. e. sensitive to blue light. If necessary, blue filters may be provided between the strip and the photoelectric cells to cut off light from the red end of the spectrum.

Although in accordance with the provisions of the patent statutes, this invention is described as embodied in concrete form and the principle of the invention has been described, together with the best mode in which it is now contemplated applying that principle, it will be understood that the invention is not limited to the precise elements and connections shown, since alterations and modifications will readily suggest themselves to persons skilled in the art without departing from the true spirit of the invention or from the scope of the annexed claims.

What I claim as new and desire to secure by Letters Patent of the United States, is:

1. A system for indicating the position of the edge of an object comprising means for projecting a light beam past said edge so that a portion of said beam is intercepted by said object and the amount of said portion is varied in response to movement of said object, means for changing the position of said beam, light sensitive means responsive to the unintercepted portion of said beam for controlling said position changing means to move said beam to a position in which the amount of light received by said light sensitive means has a predetermined relationship to the position of said edge, and means controlled by said light sensitive means for indicating the position of said beam.

2. A system for indicating the position of the edge of an object comprising means for projecting a light beam past said edge so that a portion of said beam is intercepted by said object and the magnitude of said portion varies in response to a change in the position of said edge, electroresponsive means for changing the position of said beam, light sensitive means responsive to a change in the amount of said beam passing said edge to control the supply of current to said electroresponsive means to effect a movement of said beam in a direction to produce an opposite change in the amount of said beam received by said light sensitive means until said system is balanced, and means responsive to said current for indicating the position of said beam throughout a predetermined range.

3. A device for indicating the width of an object that is subject to movement in the direction of its width comprising means for projecting a beam of light past each of opposite edges of said object so that a portion of each of said beams is intercepted by said object, light sensitive means responsive to variations in the amount of the beams passing said edges and means controlled by said light sensitive means for independently moving said beams to follow changes in the position of said edges, and means for indicating the algebraic sum of the deviations of said beams from fixed positions.

4. A device for indicating the width of an object that is subject to movement in the direction of its width comprising a first means for projecting a beam of light past one edge of said object so that a portion of said beam is intercepted by one of said edges, a second means for projecting a beam of light past the opposite edge of said object so that a portion of said beam is intercepted by said object, a light sensitive device arranged to receive the unintercepted portion of one of said beams and a second light sensitive device arranged to receive the unintercepted portion of the other of said beams, means controlled by each of said light sensitive devices for independently moving said beams to new positions to follow changes in the positions of said edges, and means for indicating the algebraic sum of the deviations of said beams from fixed points.

5. A device for indicating variations in the position of the edge of a strip of moving material comprising a supporting member arranged in proximity to the edge of the strip, a circuit including a light sensitive device mounted on said support in position to receive a beam of light projected past the edge of said strip, an electric meter element mounted on said support, said meter having a stationary member and a movable member, a mirror mounted on said movable member, a source of light, means comprising a member provided with a slit interposed between said light source and said mirror for projecting a narrow beam of light to the reflecting surface of said mirror, a condensing lens mounted on said support at one side of said strip for receiving the beam of light reflected from said mirror and transmitting said reflected beam past the edge of said strip, a second condensing lens mounted on said support on the opposite side of said strip for receiving and transmitting said reflected beam to said light sensitive means so that movement of the edge of said strip into said beam varies the current flowing in said circuit, an amplifier for amplifying said current, connections for supplying said amplified current from said amplifier to said meter to cause said movable member to move and change the position of said reflected light beam until the amount of light received by said light sensitive device is in predetermined proportion to the change in the position of the edge of said strip, and a meter in said connections calibrated to indicate said change in position.

6. A device for indicating the position of the edge of a moving strip of material comprising a support arranged in proximity to the edge of said strip, an electric meter element mounted on said support and having a stationary member and a cooperating movable member, an electric circuit, a light sensitive element mounted on said support and included in said circuit, means comprising a source of light and a mirror mounted on said movable meter member for projecting a relatively narrow beam of light past the edge of said strip to said light sensitive device so that the amount of light received by said light sensitive device and the curent flowing in said circuit are varied in response to movement of the edge of said strip from a predetermined position, means for amplifying said current and supplying the amplified current to said meter thereby to move said beam to a position in which the amount of light received by said light sensitive device and the current supplied to said meter have a predetermined relationship to the position of the edge of said strip, and indicating means included in the connections between said amplifier and said meter.

7. A device for indicating the position of the edge of a moving strip of material comprising a support arranged in proximity to the edge of the strip, an electric meter element mounted on said support and having a stationary member and a cooperating movable member, an electric circuit, a light sensitive element mounted on said support and included in said circuit, means comprising a source of light, a mirror mounted on said movable meter element and a member provided with a relatively narrow slit interposed between said source and said mirror for projecting a relatively narrow beam of light past the edge of said strip to said light sensitive device so that the amount of light received by said light sensitive device and the current flowing in said circuit are varied in response to a change in the position of the edge of said strip, a condensing lens mounted between said mirror and said strip and a second condensing lens mounted between said strip and said light sensitive device, means for amplifying the current flowing in said circuit and for supplying the amplified current to said meter thereby to move said beam to a position in which the amount of light received by said light sensitive device and the current supplied to said meter have a predetermined relationship to the position of the edge of said strip, and an electrical indicating device included in the connections between said amplifier and said meter.

8. A device for indicating the width of a moving strip of material comprising supporting means arranged in proximity to both edges of the strip, a pair of meter elements mounted on said supporting means each having a stationary member and a cooperating movable member, a pair of light sensitive devices mounted on said supporting means at opposite edges of said strip, an electric circuit for each of said light sensitive devices, means comprising a source of light, and a mirror mounted on each of said movable meter elements for projecting a relatively narrow beam of light past one edge of said strip to one of said light sensitive devices and a second relatively narrow beam of light past the other edge of said strip to the other of said light sensitive devices so that the amount of light received by said light sensitive devices and the currents flowing in said circuits are varied in response to changes in the positions of the edges of said strip, means for amplifying said currents, a pair of circuits having a common conductor for supplying the amplified currents of each of said light sensitive devices to the associated meter element thereby to cause said beams to move to positions in which the amount of light received by said light sensitive devices and the currents supplied to said meter elements have predetermined relationships to the positions of the edges of said strip, and an indicating device in said common conductor for indicating the width of said strip.

WILLIAM D. COCKRELL.